(12) United States Patent
Kehr et al.

(10) Patent No.: US 11,843,288 B2
(45) Date of Patent: Dec. 12, 2023

(54) ROTOR FOR AN ELECTRIC MACHINE AND ELECTRIC MACHINE HAVING A ROTOR

(71) Applicant: ZF Friedrichshafen AG, Friedrichshafen (DE)

(72) Inventors: Ulrich Kehr, Tettnang (DE); Jochen Eggler, Waldburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 37 days.

(21) Appl. No.: 17/570,706

(22) Filed: Jan. 7, 2022

(65) Prior Publication Data
US 2022/0271627 A1 Aug. 25, 2022

(30) Foreign Application Priority Data
Feb. 19, 2021 (DE) ...................... 10 2021 201 605.7

(51) Int. Cl.
*H02K 11/25* (2016.01)
(52) U.S. Cl.
CPC .......... *H02K 11/25* (2016.01); *H02K 2211/03* (2013.01)
(58) Field of Classification Search
CPC ............... H02K 11/25; H02K 2211/03; H02K 11/0094; H02K 11/35; H02J 7/14; H02J 50/10; H02J 50/12; G01D 11/00
USPC ...................................................... 310/68 C
See application file for complete search history.

(56) References Cited

U.S. PATENT DOCUMENTS

| 6,504,275 | B2 * | 1/2003 | Nondahl | H02K 11/20 310/68 B |
|---|---|---|---|---|
| 2001/0008352 | A1 * | 7/2001 | Nondahl | H02K 11/20 310/68 C |
| 2011/0285256 | A1 * | 11/2011 | Hyde | H02K 11/20 310/68 R |
| 2014/0042876 | A1 * | 2/2014 | Brockerhoff | H02K 11/21 310/68 B |
| 2015/0233736 | A1 * | 8/2015 | Habenschaden | G01D 5/202 324/207.25 |
| 2015/0349685 | A1 * | 12/2015 | Schock | H02P 6/20 318/400.11 |
| 2018/0026496 | A1 * | 1/2018 | Zhi | H02K 11/35 310/68 B |
| 2022/0271582 | A1 * | 8/2022 | Eggler | H02K 11/0094 |
| 2022/0271585 | A1 * | 8/2022 | Eggler | H02K 1/2766 |

(Continued)

FOREIGN PATENT DOCUMENTS

| DE | 102006021489 A1 | 11/2007 |
|---|---|---|
| DE | 102014213446 | * 12/2016 |

(Continued)

*Primary Examiner* — Ahmed Elnakib
(74) *Attorney, Agent, or Firm* — Dority & Manning, P.A.

(57) ABSTRACT

A rotor (1) for an electric machine (2) includes at least one sensor element (3) configured for detecting at least one condition variable of the rotor (1), a signal processing unit (4) connected to the at least one sensor element (3) and configured for generating measured data from the detected condition variable of the rotor (1) and transmitting the measured data to a control device (5), and at least one induction coil (7) that includes at least one electrical conductor (8), is arranged at least indirectly on an end face of the rotor (1), and is configured for generating electrical energy from a magnetic front stray field (12) rotating in relation to the rotor (1) during the operation of the electric machine (2).

14 Claims, 2 Drawing Sheets

(56) References Cited

U.S. PATENT DOCUMENTS

| | | | |
|---|---|---|---|
| 2022/0271625 A1* | 8/2022 | Kehr | H02J 50/10 |
| 2022/0271627 A1* | 8/2022 | Kehr | H02K 11/0094 |

FOREIGN PATENT DOCUMENTS

| | | | |
|---|---|---|---|
| WO | WO 2007/128673 | | 11/2007 |
| WO | WO 2016063094 | * | 4/2016 |
| WO | WO 2018178839 | * | 10/2018 |
| WO | WO 2019147404 | * | 8/2019 |

* cited by examiner

ROTOR FOR AN ELECTRIC MACHINE AND ELECTRIC MACHINE HAVING A ROTOR

CROSS-REFERENCE TO RELATED APPLICATION

The present application is related and has right of priority to German Patent Application No. 102021201605.7 filed in the German Patent Office on Feb. 19, 2021, which is incorporated by reference in its entirety for all purposes.

FIELD OF THE INVENTION

The invention relates generally to a rotor for an electric machine. The invention further relates generally to an electric machine having a rotor of this type.

BACKGROUND

For example, DE 10 2006 021 489 A1 discloses an electric machine having a stator and a rotor. The electric machine is designed as a permanent-magnet synchronous machine, wherein the rotor includes a rotor body having permanent magnets arranged in the interior of the rotor body as well as flux barriers. The permanent magnets form poles of the electric machine, wherein at least one permanent magnet is arranged in the area of each pole.

In order to be able to optimally operate an electric machine, it is significant, in particular, to determine condition variables of the rotor by sensors and make the condition variables available to a control device of the electric machine. Previously it has been difficult to supply such sensors, which are associated with the rotor of the electric machine and rotate together with the rotor, with sufficient electrical energy.

For example, the continuous power of an electric machine is limited, among other things, by the maximum permissible temperature of the rotor, in particular of the magnets in the case of a permanent-magnet synchronous machine or of the cage of an induction machine. During the operation of the electric machine, the current rotor temperature is generally not known as a measured quantity and is estimated by a temperature model. As a result, an allowance must be made for a safety margin for the maximum temperature, and so the electric machine cannot be optimally operated due to this safety margin. If the maximum temperature is exceeded, there is a risk of the electric machine overheating and becoming damaged.

SUMMARY OF THE INVENTION

Example aspects of the present invention provide a rotor for an electric machine, and an electric machine. In particular, the operation of the electric machine is to be improved and the risk of the electric machine overheating is to be reduced by the rotor. Moreover, the rotor is to be easily and quickly installable.

A rotor according to example aspects of the invention for an electric machine includes at least one sensor element, which is configured for detecting at least one condition variable of the rotor, a signal processing unit connected to the at least one sensor element, which is configured for generating measured data from the detected condition variable of the rotor and transmitting the measured data to a control device, and at least one induction coil, which includes at least one electrical conductor and is arranged at least indirectly on an end face of the rotor and is configured for generating electrical energy from a magnetic front stray field, which is rotating in relation to the rotor or temporally changing during the operation of the electric machine.

In other words, the rotor of the electric machine includes the at least one sensor element, optionally multiple sensor elements, as well as the signal processing unit and the at least one induction coil including the at least one electrical conductor. In particular, the at least one sensor element, the signal processing unit, and the at least one induction coil are connected to the rotor in a positionally fixed manner and, thereby, rotate together with the rotor.

Preferably, the at least one induction coil is configured for supplying the signal processing unit and/or the at least one sensor element with electrical energy. Consequently, either the signal processing unit is supplied with electrical energy or the at least one sensor element is supplied with electrical energy or both the signal processing unit as well as the at least one sensor element are supplied with electrical energy.

By the at least one induction coil, it is possible during the operation of the electric machine to obtain electrical energy from the magnetic front stray field rotating in relation to the rotor, in that the changing front stray field flows through the at least one induction coil when the rotor is rotating, as the result of which an electric current or a voltage is induced in the at least one induction coil, which is utilized for supplying electrical energy to the at least one sensor element and/or the signal processing unit, which are arranged at the rotor in a rotationally fixed manner and rotate together with the rotor. In this way, collecting rings and batteries for the power supply of the components rotating with the rotor can be dispensed with, as the result of which the rotor can be easily and quickly installed. The end-face arrangement of the at least one induction coil at the rotor is particularly advantageous, because, as a result, the at least one induction coil does not engage into the active part of the rotor.

The magnetic front stray field is formed at both end faces of the rotor and has field lines that extend from the stator to the rotor. In a magnetic sense, the field lines in the magnetic circuit are parallel to the field lines in the air gap. As a result, the same harmonics are contained in the front stray field that are also present in the air gap field. The geometric direction of the field lines in the front stray field differs, however, from the direction of the field lines in the air gap field. While the field lines in the air gap field extend essentially in a plane perpendicular to the rotor axis, the field lines in the front stray field have an axial component. The harmonics of the front stray field rotate, depending on the temporal and spatial order, at least partially at a rotational speed that differs from the rotor rotation. As a result, as observed from a point on the end face of the rotor, a temporally variable field strength is present. As a result, a voltage is induced in the induction coil, which is located in the front stray field and is mechanically fixedly connected to the rotor. Therefore, electrical energy can be generated via the induction coil.

The at least one sensor element can be arranged directly at the rotor and, there, immediately detect condition variables of the rotor, in particular a temperature of the rotor, in order to reduce the risk of the electric machine overheating. The at least one sensor element is just as suitable for measuring absolute temperatures as it is for detecting temperature differences. For example, the temperature of the rotor is a condition variable of the rotor. For example, the at least one sensor element is arranged directly at or at least adjacent to the point of origin of the condition variable. A short measuring path between the at least one sensor element and the point of origin of the condition variable increases the measuring accuracy.

Preferably, the energy transmission takes place at least between the at least one induction coil and the element to be supplied with energy by wiring. In one first example embodiment, the induction coil can be connected to the at least one sensor element by wiring. Alternatively, the induction coil can be connected to the signal processing unit by wiring. Alternatively, the induction coil can be arranged on a circuit board together with the signal processing unit. Alternatively, the induction coil can be arranged on a circuit board together with the sensor.

In particular, the signal processing unit is wirelessly connected to the control device for signal transmission and/or data transmission. The at least one sensor element is preferably connected to the signal processing unit via wiring for signal transmission and/or data transmission. For example, the control device is arranged outside the rotor, although within the vehicle.

According to one preferred example embodiment of the invention, a coil width of the induction coil is matched to one spatial order of harmonics of the magnetic front stray field. In particular, the position of the induction coil at the rotor and the coil width of the induction coil, i.e., the distance between a forward-conductor section and a return-conductor section of the induction coil, are matched to strongly present orders of harmonics of the magnetic front stray field. These orders of harmonics of the magnetic front stray field do not move synchronously with the rotor and cause a temporally changing magnetic field, which is particularly well suited for generating electrical energy by means of the induction coil. Harmonics of the front stray field, which move in relation to the rotor, arise, for example, due to the discrete distribution of the energized stator windings in grooves or due to the change of the magnetic conducting properties of the stator in the circumferential direction during the change between a stator groove and a stator tooth in interaction with the magnetic properties and the magnetic excitation by the rotor.

According to one preferred example embodiment of the invention, an axis of the induction coil is formed essentially in parallel to an axis of rotation of the rotor. In other words, the induction coil and the rotor are arranged essentially axially parallel to each other.

In one preferred example embodiment, the forward conductor is a section of the coil conductor of the induction coil, which, on the rotor end face, extends essentially in the direction from radially inside toward the outside or from the outside toward the inside. Preferably, the return conductor is a further section of the coil conductor, which, on the rotor end face, extends essentially in the direction from radially inside toward the outside or from the outside toward the inside.

The spatial order of the harmonics divides the end face into circular segments, wherein each circular segment corresponds to one spatial period duration. In the following, the harmonic wavelength is understood as the extension of a circular segment, which is defined in this way, in the circumferential direction. In other words, the harmonic wavelength on the rotor end face corresponds to an angle in a polar coordinate system about the rotor axis. The distance of the forward conductor to the return conductor corresponds to approximately one half of the wavelength of the harmonic to be harvested. If the induction coil has multiple windings, the mean distance corresponds, for example, to approximately one half of the wavelength of the harmonic to be harvested. For example, the mean distance of the forward conductors to the return conductors is the three-tenths (0.3) times to the seven-tenths (0.7) times of the wavelength of the harmonic to be harvested. Preferably, the spatial order of the harmonic to be harvested is matched to the number of grooves of the stator. Preferably, the spatial order of the harmonic to be harvested is selected in such a way that the spatial order of the harmonic is equal to the number of the grooves per pole pair plus or minus one.

According to one preferred example embodiment of the invention, the signal processing unit is arranged at least indirectly at an end face of the rotor. Alternatively or additionally, preferably the at least one sensor element is arranged at least indirectly at an end face of the rotor. An at least indirect arrangement of a component at the rotor is to be understood to mean that this component can be arranged at the rotor either directly, i.e., immediately or via a single further component, i.e., indirectly via this further component.

For example, the at least one sensor element is arranged in an area of the rotor that heats up to an extreme extent when the electric machine is loaded. The at least indirect end-face arrangement at least of the signal processing unit, optionally also of the at least one sensor element, is advantageous, since the properties of the rotor, in particular the electrical and magnetic properties of the electric machine, are not negatively influenced. Moreover, the end face of the rotor is particularly readily accessible not only for the installation, but rather also for maintenance, as the result of which the rotor and the elements arranged thereon can be easily and quickly installed.

According to one preferred example embodiment of the invention, the at least one sensor element is integrated in the signal processing unit. Consequently, the at least one sensor element and the signal processing unit form one single component, which is arranged at the rotor.

According to one preferred example embodiment of the invention, the at least one sensor element is arranged in the interior of the rotor. In other words, the at least one sensor element is not arranged on a surface of the rotor, but rather in a recess in the rotor. In particular, the at least one sensor element is arranged in the interior of the rotor in such a way that a point of origin of the condition variable is in close proximity of the sensor element.

According to one preferred example embodiment of the invention, the at least one induction coil is arranged on a circuit board. This embodiment is not only particularly easy to install, but rather, it is also optimized for production. A circuit board is to be understood as a printed circuit plate, i.e., a flat element having two relatively large end faces, wherein one of the end faces is designed for placement against the rotor and the other end face is designed for accommodating the induction coil. For example, the conductor is arranged on an end face of the circuit board and is fixedly connected to the circuit board in order to form the induction coil on the circuit board. Preferably, the circuit board is arranged on an end face of the rotor and comes to rest directly at the rotor. For example, the circuit board is fixed at the end face of the rotor by adhesive. Consequently, no further components, but rather optionally only adhesive, are/is arranged between the end face of the rotor and the end face of the circuit board facing the rotor. The adhesive can be applied at points, on at least a portion of the surface, or on the entire surface between the rotor and the circuit board. For example, the circuit board is designed to be rigid or at least partially flexible and partially rigid, in particular, semi-flexible. A rigid circuit board offers the advantage of high strength and dimensional stability also at high rotational speeds of the rotor.

According to one preferred example embodiment of the invention, the signal processing unit is integrated into the circuit board. Consequently, the signal processing unit is a fixed integral part of the circuit board. Due to the integration, separate components are saved.

According to one preferred example embodiment of the invention, the conductor of the at least one induction coil is integrated into the circuit board, i.e., is a fixed integral part of the circuit board. In particular, the conductor of the at least one induction coil is printed on the circuit board. Due to the integration, separate components are saved. Preferably, the conductor of the at least one induction coil includes several teeth formed in the radial direction. For example, the teeth of the conductor are designed to be rectangular and are uniformly distributed. For example, the conductor has a number of teeth that is equal to the wavelength of the harmonic to be harvested. The teeth are arranged extending in the circumferential direction in an area adjacent to an outer circumference of the circuit board.

An electric machine according to example aspects of the invention includes a control device for the open-loop control of the electric machine as well as a stator and a rotor according to example aspects of the invention. An air gap is formed between the stator and the rotor. The control device is preferably arranged in the vehicle and is utilized for the open-loop and closed-loop control of the electric machine.

Example aspects of the invention also relate to a vehicle having an electric machine according to example aspects of the invention. In particular, the vehicle is designed as a motor vehicle, for example, a passenger car, wherein the electric machine is configured as a prime mover of the vehicle in order to at least partially or completely electrically drive the vehicle. Consequently, the vehicle is preferably designed as a hybrid vehicle or as an electric vehicle.

BRIEF DESCRIPTION OF THE DRAWINGS

Multiple preferred example embodiments of the invention are explained in greater detail in the following with reference to the drawings, wherein identical elements are labeled with the same reference character, wherein.

DETAILED DESCRIPTION

Figure 1:
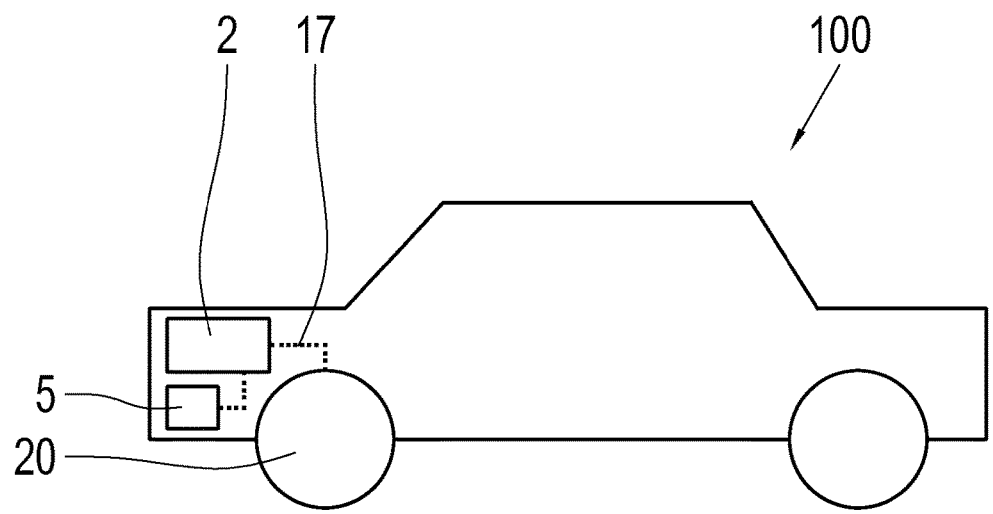
FIG. 1 shows a highly simplified schematic of a vehicle including an electric machine according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

According to FIG. 1, a vehicle 100 includes an electric machine 2 according to example aspects of the invention, which is configured for driving the vehicle 100. For this purpose, the electric machine 2 is drivingly connected, for example, via shafts 17 and, optionally, via further components, to driving wheels 20 of the vehicle 100. Moreover, the electric machine 2 is actuated and operated by a control device 5, which is arranged in the vehicle 100. In particular, the control device 5 is utilized for protecting the electric machine 2 against overheating during the operation, in that the maximum power of the electric machine 2 is adapted, in particular to a currently measured temperature of the rotor 1. For this purpose, the control device 5 is connected to the electric machine 2 in a signal-transmitting manner.

Figure 2:
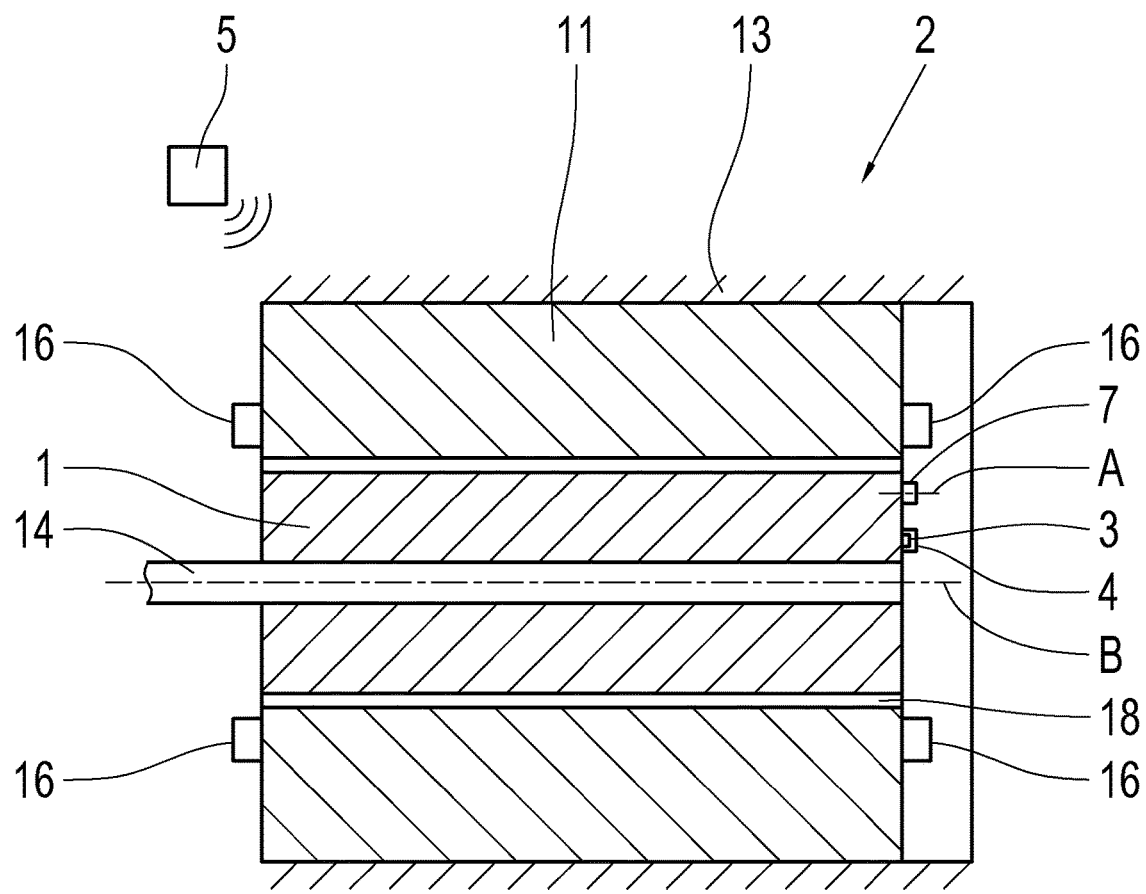
FIG. 2 shows a highly simplified diagrammatic longitudinal sectional representation of the electric machine according to example aspects of the invention including a stator and a rotor.

FIG. 2 shows the electric machine 2, which includes the control device 5 for the open-loop control of the electric machine 2, and a stator 11 and a rotor 1. An air gap 18 is formed between the stator 11 and the rotor 1. The rotor 1 is rotationally fixed to a rotor shaft 14. In the housing 13 of the electric machine 2, a signal processing unit 4 including a sensor element 3 is arranged on an end face of the rotor 1. The sensor element 3 is integrated into the signal processing unit 4. Alternatively, the sensor element 3 can be arranged in the interior of the rotor 1. Moreover, an induction coil 7 is arranged on an end face of the rotor 1 and is configured for generating electrical energy in order to supply the sensor element 3 and the signal processing unit 4 with electrical energy. An axis A of the induction coil 7 is formed essentially in parallel to an axis of rotation B of the rotor 1. The stator 11 has a stator body designed as a stator laminated core and multiple coils accommodated by the stator body, and winding overhangs 16 protruding axially from the stator 11 on both sides. The rotor 1 has a rotor body designed as a rotor laminated core and multiple permanent magnets arranged in the interior of the rotor body.

The sensor element 3 measures a temperature at the rotor 1 as a condition variable of the rotor 1 and transmits this condition variable to the signal processing unit 4. Optionally, multiple sensor elements 3 can be arranged at the rotor 1, which detect, for example, different condition variables of the rotor 1. The signal processing unit 4 generates measured data from the detected condition variables of the rotor 1 and transmits the measured data to the control device 5 installed in the vehicle 100. The control device 5 is connected to the signal processing device 4 at the rotor 1 wirelessly, for example, via radio, and is configured for actuating the electric machine 2 under consideration of demands of a driver as well as operating parameters of the electric machine 2, in particular, operating parameters and/or condition variables of the rotor 1.

Figure 3:
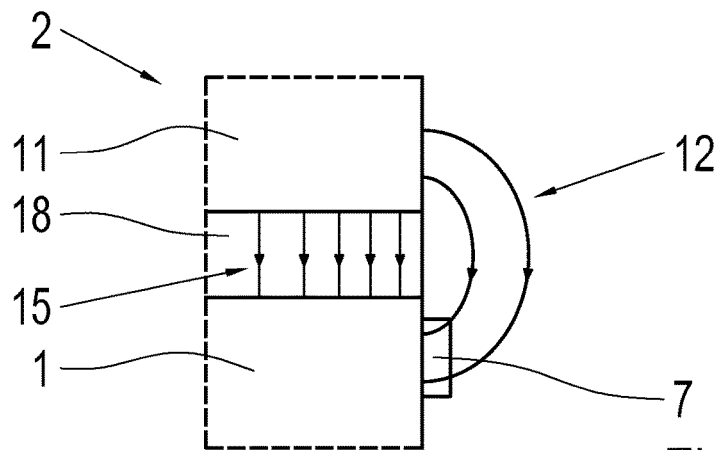
FIG. 3 shows a highly simplified detailed schematic of a section of the electric machine according to example aspects of the invention, according to FIG. 2.

FIG. 3 shows an enlarged section of the electric machine 2 from FIG. 2. The rotor 1 is rotatably arranged in the interior of the stator 11, wherein the air gap 18 is formed between the stator 11 and the rotor 1. In the air gap 18, a magnetic field 15 is formed between an inner circumferential surface of the stator 11 and an outer circumferential surface of the rotor 1. Moreover, a magnetic front stray field 12 is also formed on an end face from the stator 11 to the rotor 1. The size, specifically the coil width in the circumferential direction, of the induction coil 7 at the end face of the rotor 1 is matched to one spatial order of harmonics of the magnetic front stray field 12. During the operation of the electric machine 2, i.e., during rotation of the rotor 1, the induction coil 7 generates electrical energy from the magnetic harmonic-front stray field 12 rotating in relation to the rotor 1 and supplies the sensor element 3 and the signal processing unit 4 with this electrical energy. These orders of harmonics of the magnetic front stray field do not move synchronously with the rotor 1 and cause a temporally changing magnetic field, which is particularly well suited for supplying electrical energy by the induction coil 7. Alternatively, further induction coils 7 can be arranged at the rotor 1 for generating electrical energy from the magnetic front stray field 12 rotating in relation to the rotor 1.

Figure 4:
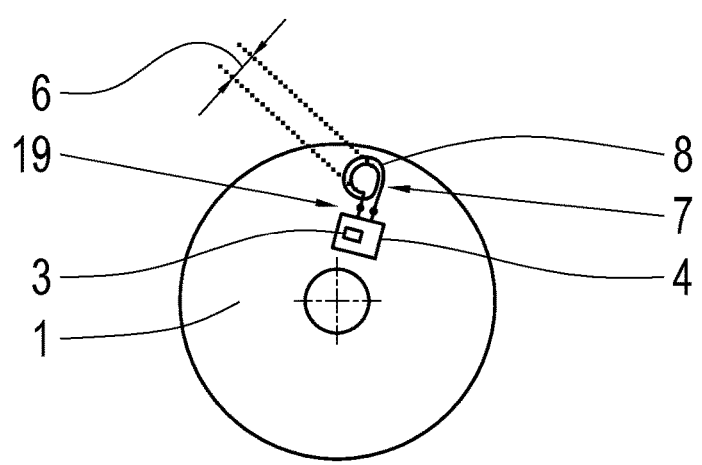
FIG. 4 shows a highly simplified diagrammatic side view of the rotor according to FIG. 2 and FIG. 3.

FIG. 4 shows the end face of the rotor 1 according to FIG. 2 and FIG. 3. The stator is not shown. The coil width 6 of the induction coil 7 is also matched to the spatial order of harmonics of the magnetic front stray field 12. The coil width 6 indicates the radial distance between the opposite conductor sections of the conductor 8 of the induction coil 7. The signal processing unit 4 is arranged directly on an end face of the rotor 1, wherein the sensor element 3 is integrated into the signal processing unit 4. The induction coil 7 is connected via an electrical line 19 to the signal processing unit 4 and the sensor element 3 integrated therein. In order to convert the alternating current to direct current and provide the direct current for the sensor element 3, the signal processing unit 4 has, for example, an oscillating circuit (not represented in greater detail, but generally known), a rectifier, and a capacitor.

Figure 5:
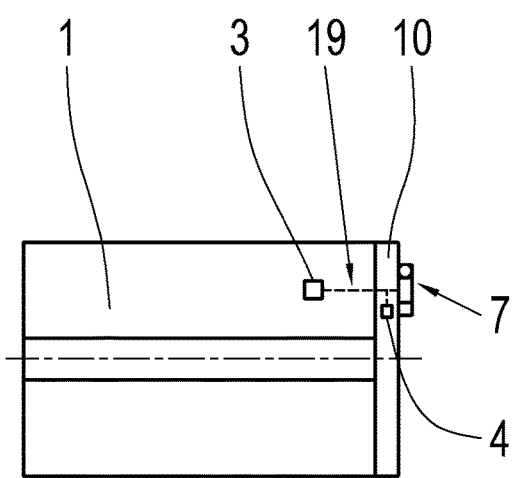
FIG. 5 shows a highly simplified diagrammatic longitudinal sectional representation of the rotor according to a second exemplary embodiment.

In FIG. 5, a second example embodiment of the rotor 1 is represented. In the present case, the induction coil 7 is arranged on a circuit board 10, wherein the circuit board 10 is arranged on an end face of the rotor 1 and comes to rest directly at the rotor 1. An adhesive between the circuit board 10 and the rotor 1 fixes the circuit board 10 on an end face of the rotor 1. In the present case, the circuit board 10 covers the entire end face of the rotor 1. The signal processing unit 4 is integrated into the circuit board 10 and the sensor element 3 is arranged in the interior of the rotor 1. The signal processing unit 4, the sensor element 3, and the induction coil 7 are operatively connected to each other via electrical lines 19.

Figure 6:
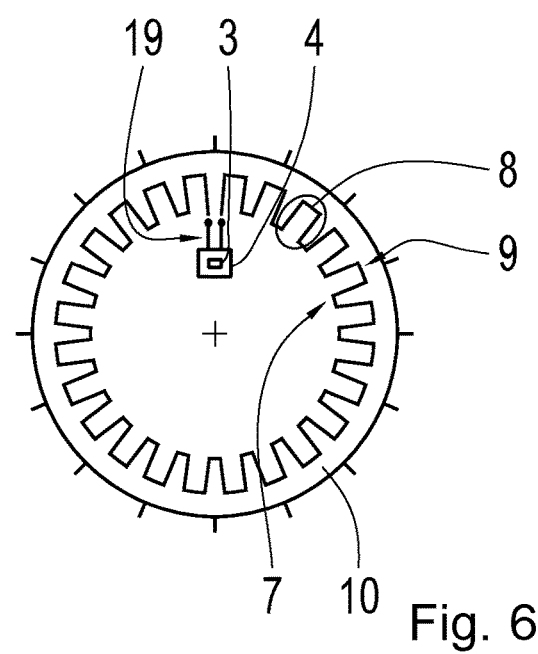
FIG. 6 shows a highly simplified diagrammatic side view of the rotor according to a third exemplary embodiment.

FIG. 6 shows a third example embodiment of the rotor 1, wherein only the end face of a circuit board 10 arranged thereon is visible in the present case. In contrast to the circuit board 10 according to FIG. 5, according to the third example embodiment of the rotor 1, the conductor 8 of the induction coil 7 is integrated into the circuit board 10, designed as a printed strip conductor in the present case. The conductor 8 is designed in a meandering manner extending in the circumferential direction and not overlapping, in an area adjacent to an outer circumference of the circuit board 10. Due to the meandering shape of the conductor 8, multiple rectangular teeth 9 are formed in the radial direction. All teeth 9 are identically designed and uniformly circumferentially distributed. The signal processing unit 4 is integrated, together with the sensor element 3, into the circuit board 10. The signal processing unit 4 and the induction coil 7 are operatively connected to each other via electrical lines 19.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 rotor
2 electric machine
3 sensor element
4 signal processing unit
5 control device
6 coil width
7 induction coil
8 electrical conductor
9 tooth
10 circuit board
11 stator
12 front stray field
13 housing
14 rotor shaft
15 magnetic field in the air gap
16 winding overhang
17 shaft
18 air gap
19 electrical line
20 driving wheel
100 vehicle
A axis of the induction coil
B axis of rotation of the rotor

The invention claimed is:

1. A rotor (1) for an electric machine (2), comprising:
   at least one sensor (3) configured for detecting at least one condition variable of the rotor (1);
   a signal processing unit (4) connected to the at least one sensor (3) and configured for generating measured data from the detected condition variable of the rotor (1) and for transmitting the measured data to a control device (5); and
   at least one induction coil (7) that comprises at least one electrical conductor (8), is arranged at least indirectly on an end face of the rotor (1), and is configured for generating electrical energy from a magnetic front stray field (12) rotating in relation to the rotor (1) during the operation of the electric machine (2),
   wherein a coil width (6) of the at least one induction coil (7) is matched to one spatial order of harmonics of the magnetic front stray field (12).

2. The rotor (1) of claim 1, wherein the at least one induction coil (7) is configured for supplying one or both of the signal processing unit (4) and the at least one sensor (3) with electrical energy.

3. The rotor (1) of claim 1, wherein an axis (A) of the at least one induction coil (7) is essentially parallel to an axis of rotation (B) of the rotor (1).

4. The rotor (1) of claim 1, wherein the signal processing unit (4) is arranged at least indirectly on the end face of the rotor (1).

5. The rotor (1) of claim 1, wherein the at least one sensor (3) is arranged at least indirectly on the end face of the rotor (1).

6. The rotor (1) of claim 1, wherein the at least one sensor (3) is integrated into the signal processing unit (4).

7. The rotor (1) of claim 1, wherein the at least one induction coil (7) is arranged on a circuit board (10).

8. The rotor (1) of claim 7, wherein the circuit board (10) is arranged on the end face of the rotor (1) and rests directly at the rotor (1).

9. The rotor (1) of claim 7, wherein the circuit board (10) is fixed at the end face of the rotor (1) by adhesive.

10. The rotor (1) of claim 7, wherein the signal processing unit (4) is integrated into the circuit board (10).

11. The rotor (1) of claim 7, wherein the at least one electrical conductor (8) is integrated into the circuit board (10).

12. An electric machine (2), comprising:
- the control device (5) configured for open-loop control of the electric machine (2);
- a stator (11); and
- the rotor (1) of claim 1.

13. A rotor (1) for an electric machine (2), comprising:
- at least one sensor (3) configured for detecting at least one condition variable of the rotor (1);
- a signal processing unit (4) connected to the at least one sensor (3) and configured for generating measured data from the detected condition variable of the rotor (1) and for transmitting the measured data to a control device (5); and
- at least one induction coil (7) that comprises at least one electrical conductor (8), is arranged at least indirectly on an end face of the rotor (1), and is configured for generating electrical energy from a magnetic front stray field (12) rotating in relation to the rotor (1) during the operation of the electric machine (2),
- wherein the at least one induction coil (7) is arranged on a circuit board (10),
- wherein the at least one electrical conductor (8) is integrated into the circuit board (10), and
- wherein the at least one electrical conductor (8) comprises a plurality of teeth (9) that extend along a radial direction.

14. The rotor (1) of claim 13, wherein the teeth (9) are rectangular-shaped and uniformly distributed.

* * * * *